United States Patent
Xu et al.

(10) Patent No.: US 7,649,434 B2
(45) Date of Patent: Jan. 19, 2010

(54) MULTIPHASE VOLTAGE REGULATOR HAVING COUPLED INDUCTORS WITH REDUCED WINDING RESISTANCE

(75) Inventors: Ming Xu, Blacksburg, VA (US); Yan Dong, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 11/343,204

(22) Filed: Jan. 31, 2006

(65) Prior Publication Data

US 2007/0176726 A1    Aug. 2, 2007

(51) Int. Cl.
*H01F 27/28* (2006.01)

(52) U.S. Cl. .................... 336/229; 336/212

(58) Field of Classification Search ............. 336/229
See application file for complete search history.

(56) References Cited

U.S. PATENT DOCUMENTS

| | | | | |
|---|---|---|---|---|
| 4,630,018 A | * | 12/1986 | May et al. | 336/175 |
| 6,232,864 B1 | * | 5/2001 | Hosozawa et al. | 336/178 |
| 6,348,848 B1 | * | 2/2002 | Herbert | 336/178 |
| 6,362,986 B1 | * | 3/2002 | Schultz et al. | 363/132 |
| 7,199,695 B1 | * | 4/2007 | Zhou et al. | 336/212 |
| 2004/0113741 A1 | * | 6/2004 | Li et al. | 336/212 |

FOREIGN PATENT DOCUMENTS

JP    2003303723 A  * 10/2003

OTHER PUBLICATIONS

NB83081352; Flux Rationing Transforming Winding to Effect Fractional Turns; IBM Technical Disclosure Bulletin, Aug. 1983, US; vol. 26, Issue No. 3B, Page No. 1352-1353.*

* cited by examiner

*Primary Examiner*—Anh T. Mai
*Assistant Examiner*—Joselito Baisa
(74) *Attorney, Agent, or Firm*—Whitham, Curtis, Christofferson & Cook, P.C.

(57) ABSTRACT

A multiple phase buck converter or boost converter, or buck-boost converter has an inductor in each phase. The inductors are inversely coupled. In a first embodiment, the converter includes a toroidal magnetic core with inductors extending under and over opposite sides of the toroidal magnetic core. The coupled inductors are thereby inversely coupled and have a relatively low ohmic resistance. In a second embodiment, the converter comprises a ladder-shaped magnetic core (i.e. having parallel sides, and connecting rungs). In this case, the inductors extend under the sides, and over the rungs. Each inductor is disposed over a separate rung. The ladder-shaped magnetic core is preferably disposed flat on a circuit board. Inverse coupling and low ohmic resistance are also provided in the second embodiment having the ladder structure.

9 Claims, 7 Drawing Sheets

MULTIPHASE VOLTAGE REGULATOR HAVING COUPLED INDUCTORS WITH REDUCED WINDING RESISTANCE

FIELD OF THE INVENTION

The present invention relates generally to multiphase voltage regulators (e.g. buck or boost regulators) with an inductor in each phase. More particularly, the present invention provides a coupled inductor design with reduced winding resistance. The present invention employs coupled inductors having reduced electrical resistance.

BACKGROUND OF THE INVENTION

Buck converters are commonly used to change the voltage or polarity of a DC power supply. Typically, a buck converter has several phases connected in parallel, with each phase having two switches (top and bottom switches) connected to an inductor. Such multiple phase buck converters are well known in the art and are commonly used for providing regulated DC power for microprocessors, telecommunications electronics and the like.

In recent years it has been discovered that efficiency and transient response of a multiple phase buck converter can be improved by coupling the inductors of several phases. Coupled inductors tend to decrease output current ripple, and thereby reduce the conduction loss in the switches. However, the extra conductor windings required for the coupled inductors increases the DC (ohmic) resistance of the circuit, which adversely affects the energy conversion efficiency.

It would be an advance in the art of voltage converter design to provide a multiple phase buck converter, boost converter, or buck-boost converter having coupled inductors with exceptionally low ohmic resistance. Such a voltage converter would have exceptionally high power conversion efficiency, fast transient response, and lower cost.

SUMMARY OF THE INVENTION

The present invention provides a buck, boost, or buck-boost voltage converter having a toroidal magnetic core with first and second sides. The toroidal magnetic core has first and second coupled inductors. The first inductor extends over the first side and under the second side of the toroidal magnetic core. The second inductor extends under the first side, and over the second side of the toroidal magnetic core. With the structure, the coupled inductors will be inversely coupled, and will have a low ohmic resistance.

The converter can be a 4-phase converter, in which case a second toroidal magnetic core is present, and the second toroidal magnetic core has two associated coupled inductors.

The toroidal magnetic core can be disposed flat on a circuit board, and can have air gaps to prevent magnetic saturation.

In a second embodiment, the present invention provides a buck, boost, or buck-boost voltage converter having a magnetic core with a ladder structure. The ladder structure magnetic core has first and second approximately parallel sides, and first and second rungs connecting the sides. A first inductor extends under the first side, over the first rung, and under the second side. Similarly, the second inductor extends under the second side, over the second rung, and under the first side. With the structure, the coupled inductors will be inversely coupled, and will have a low ohmic resistance.

The rungs can be perpendicular or nonperpendicular to the sides. If the rungs are nonperpendicular, they preferably have an angle of about 20-70 degrees, or 30-60 degrees with respect to the first and second sides.

Also, an interior region (between the sides and rungs) can be filled or partially filled with a ferromagnetic material to allow tuning of the leakage inductance of the coupled inductors.

The coupled inductor can have any number of rungs and any number of coupled inductors. Typically, each rung will have one inductor.

DETAILED DESCRIPTION

The present invention provides multiphase voltage converters (e.g. buck converters, boost converters, and buck-boost converters) having coupled inductors with reduced winding resistance. In a conventional, prior art multiphase converter with coupled inductors, the inductors each comprise long electrical conductors wound around a magnetic core. In the present invention, by comparison, the conductors are much shorter and therefore have lower ohmic resistance. Consequently, the energy efficiency of the voltage converter is increased in the present invention. The present coupled inductor design can be used with buck voltage converters, boost voltage converters, and buck-boost voltage converters.

Figure 1:
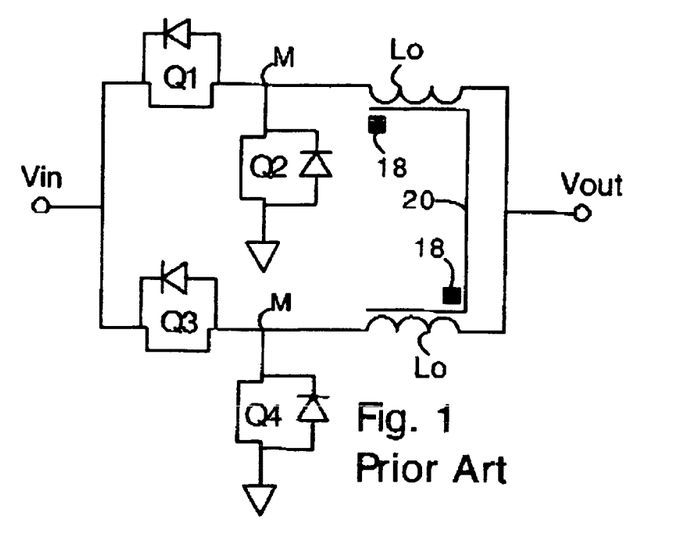
FIG. 1 (Prior Art) shows a circuit schematic of a 2-phase buck converter with coupled inductors.

FIG. 1 shows a schematic diagram of a 2-phase buck converter with coupled inductors Lo according to the prior art. Each phase has two switches Q1 Q2 and Q3 Q4 connected in series between a voltage source Vin and ground. Each pair of switches is connected at a midpoint M. The inductors Lo are alternately charged and discharged by the switches, as known in the art. The inductors Lo are inversely coupled, which is indicated by the black squares 18 located on opposite sides of the inductors Lo. The inductors Lo are coupled by a magnetic core 20, which is typically made of ferrite or similar material, as known in the art.

Figure 2:
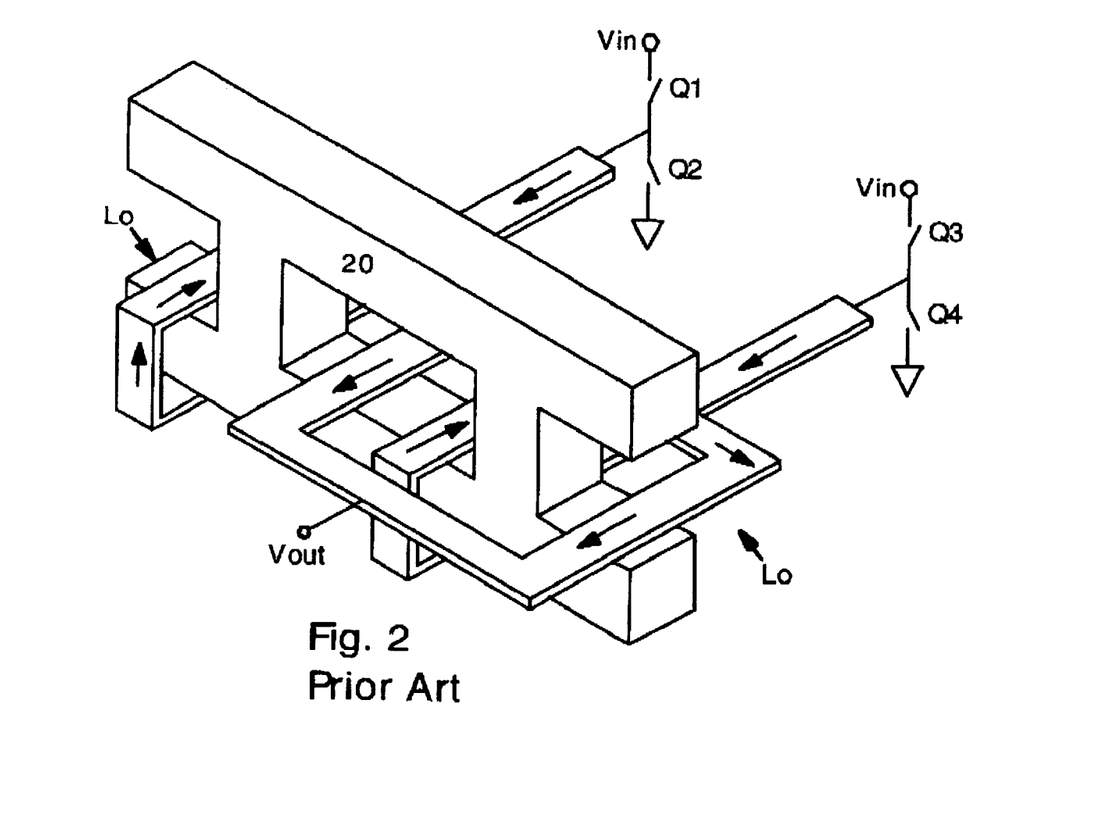
FIG. 2 (Prior Art) shows a conventional implementation of coupled inductors. The conventional implementation requires inductors having loops.
Figure 3:
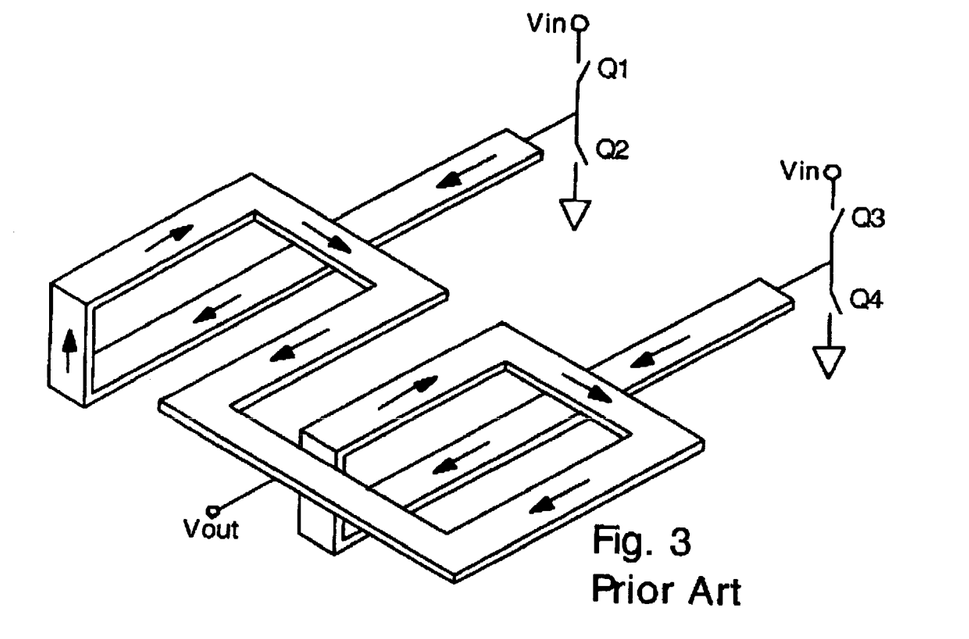
FIG. 3 (Prior Art) shows a perspective view of the inductors of FIG. 2 without the magnetic core.

FIG. 2 shows a perspective view of the inductors and magnetic core 20 of the prior art 2-phase buck converter of FIG. 1. Arrows indicate the direction of current flow. FIG. 3 shows a perspective view of the conductor traces present in the circuit of FIG. 2. For clarity, the magnetic core 20 is absent from FIG. 3. It is clear from FIGS. 2 and 3 that the inductors Lo comprise relatively long loops, and, consequently, have a relatively long length. Typically the electrical conductors are copper traces bonded to the top and bottom (or interior) surfaces of a printed circuit board (not shown).

The relatively long length of the looped inductors of the prior art tends to increase the electrical resistance of the inductors. The relatively high electrical resistance of the inductors reduces the energy conversion efficiency of the circuit, which of course is undesirable.

Figure 4:
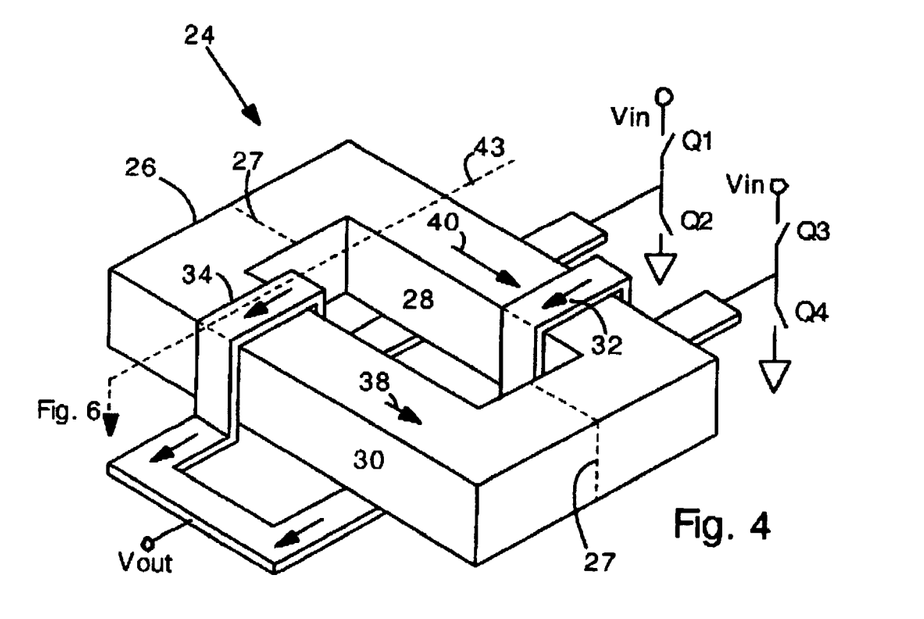
FIG. 4 shows a coupled inductor with a toroidal magnetic core according to the present invention.

FIG. 4 shows a perspective view of a 2-phase buck regulator with a coupled inductor 24 according to the present invention. The coupled inductor of the present invention includes a magnetic core 26 (e.g. made of ferrite) with a toroidal topology. The toroidal magnetic core 26 has a first side 28 and a second side 30. The first side 28 and second side 30 are the opposite sides of the toroidal magnetic core 26. A first inductor 32 extends over the first side 28, and extends under the second side 30. Similarly, a second inductor 34 extends under the first side 28, and extends over the second side 30. The first and second inductors 32 34 can comprise copper foil or wire conductors, for example.

The magnetic core 26 can have two air gaps 27 to prevent magnetic saturation. The air gaps 27 will be present in the case where the toroidal magnetic core is made from two U-cores, as known in the art. If the toroidal magnetic core 26 is made from two identical U-cores, then the air gaps 27 will be coplanar.

Figure 5:
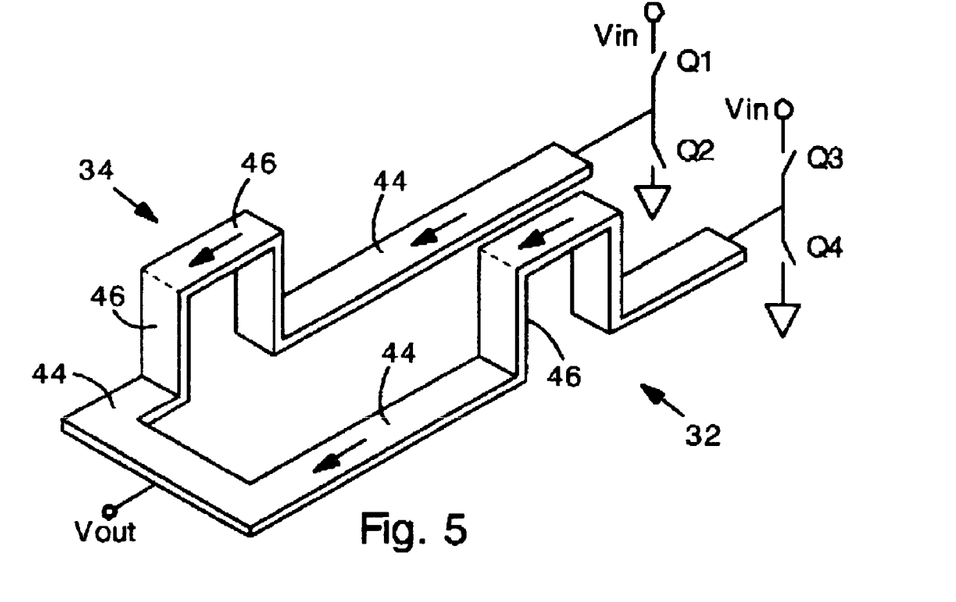
FIG. 5 shows the inductors of the device of FIG. 4 in isolation (i.e. without the toroidal magnetic core).

FIG. 5 shows a view of the inductors 32 34 without the magnetic core 26 for clarity. Horizontal portions 44 can comprise patterned copper foil on a printed circuit board, as known in the art. Elevated portions 46 of the inductors 32 34 can comprise strips of copper foil or wire soldered to the horizontal portions 44.

In operation, the inductors 32 34 receive electrical power from the switches Q1 Q2 Q3 Q4, as known in the art. An output voltage Vout is provided by the inductors 32 34 where they are connected. The inductors 32 34 produce opposing magnetic fields within the magnetic core. Specifically, inductor 34 produces a magnetic field with an orientation indicated by arrow 38, and inductor 32 produces a magnetic field with an orientation indicated by arrow 40. Hence, the inductors are inversely coupled, as desired.

Figure 6:
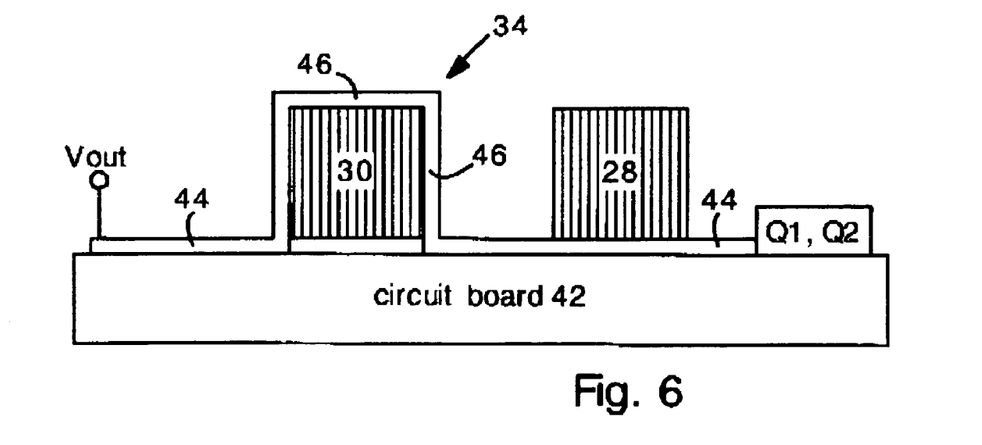
FIG. 6 shows a cross sectional side view of the device of FIG. 4 disposed flat on a circuit board.

FIG. 6 shows cross-sectional view of the coupled inductor of FIG. 4 cut along line 43. FIG. 6 shows a preferred embodiment of the present invention in which the magnetic core 26 is disposed flat on a printed circuit board 42. The term "flat" in this context means that both sides 28 and 30 define a plane that is parallel to the circuit board 42. Horizontal portions 44 of inductor 34 comprise patterned copper foil. Elevated portions 46 are soldered to the horizontal portions 44 and extend over the toroidal magnetic core.

Although the coupled inductors 32 34 are illustrated as having a single loop over the sides 28 30, the present invention and appended claims include embodiments where the coupled inductors 32 34 have 2, 3, 4 or more loops around the sides 28 30.

In the present invention, the coupled inductors 32 34 require a relatively short length and so have a relatively low ohmic resistance, compared to the prior art coupled inductor device. Hence, the present coupled inductor provides greater energy conversion efficiency in a buck or boost or buck-boost converter.

It is noted that the present coupled inductors can be used in regulators having 4 or more phases. In this case, two toroidal magnetic cores should be provided, with two coupled inductors on each magnetic core. In this case, the coupled inductors on each core should be in regulator phases that are operated 180 degrees out of phase.

In the device of FIG. 4, switches Q1 Q2 Q3 Q4 are connected to the coupled inductors 32 34 such that the circuit is a buck converter. However, the present coupled inductors can be used with boost and buck-boost converters by rearranging the connections to the switches, Vin and Vout.

Figure 7:
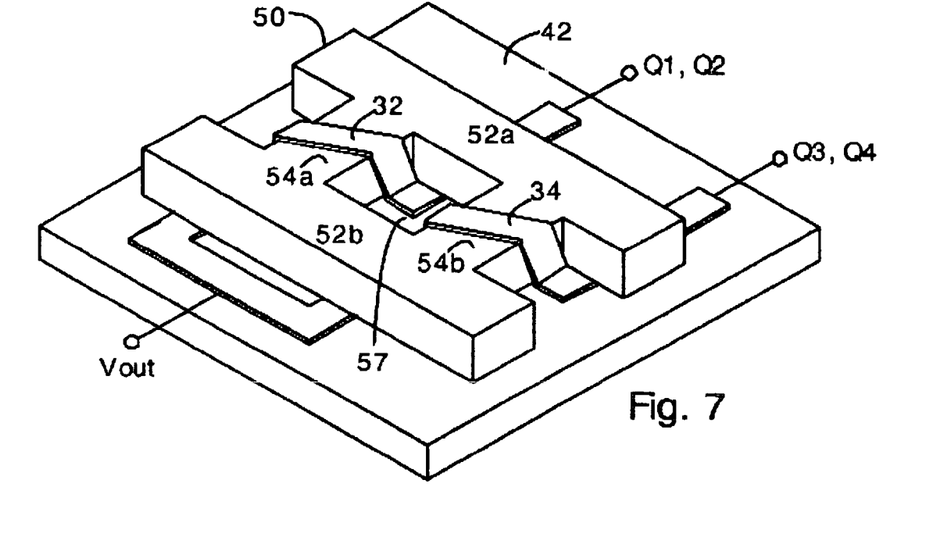
FIG. 7 shows an alternative embodiment having a ladder structure magnetic core disposed on the circuit board 42.
Figure 8:
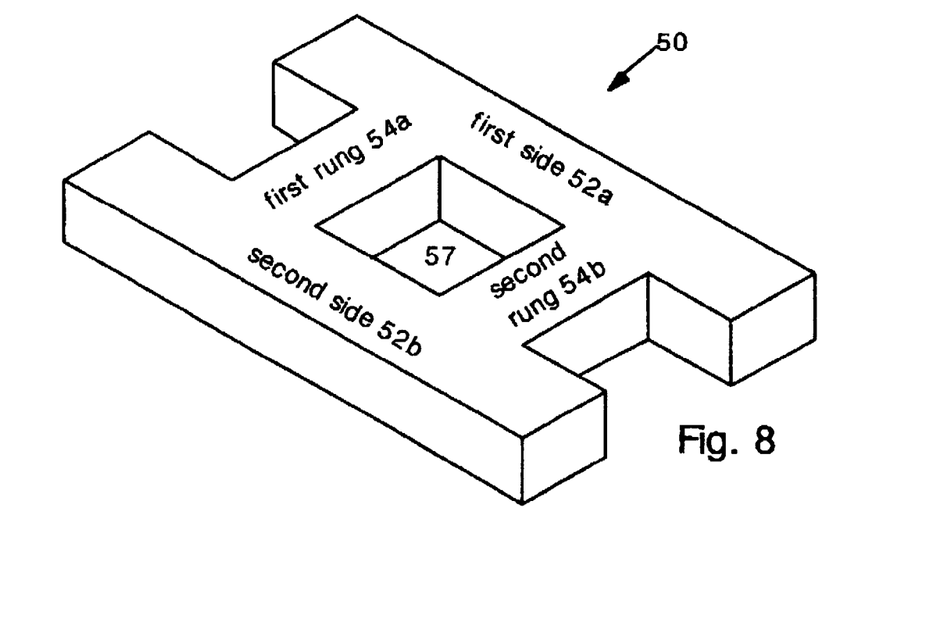
FIG. 8 shows a ladder structure magnetic core in isolation.
Figure 9:
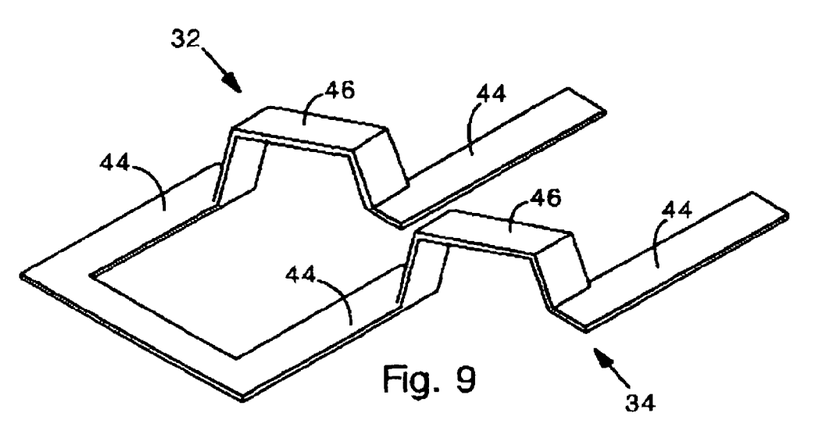
FIG. 9 shows the inductors of the device of FIG. 7 in isolation.
Figure 10:
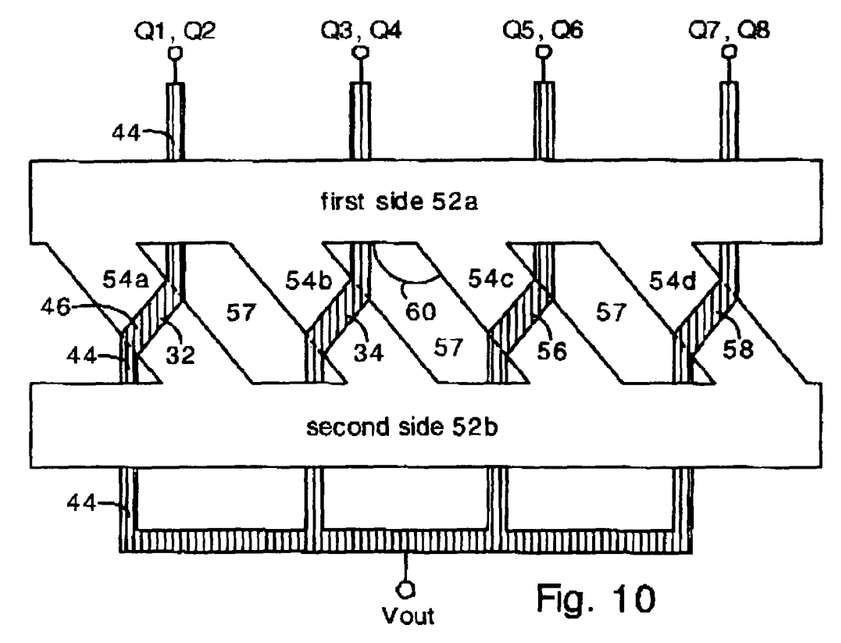
FIG. 10 shows a top view of a ladder structure magnetic core with 4 coupled inductors. The device of FIG. 10 can be used with 4-phase voltage converters.

FIG. 7 shows a second embodiment of the present invention having coupled inductors coupled by a magnetic core 50 with a ladder structure. For clarity, FIG. 8 shows the ladder-structure magnetic core 50 in isolation. The magnetic core 50 has first and second sides 52a 52b, which are approximately parallel. The sides 52a 52b are connected by first and second rungs 54a 54b. Although only two rungs 54 are illustrated in FIGS. 9 and 10, the sides 52 can be arbitrarily long, and an unlimited number of connecting rungs 54 can be present. The number of rungs 54 will preferably be the same as the number of phases (and coupled inductors) in the voltage regulator. This is because each rung 54 has an associated coupled output inductor 32 34.

The magnetic core 50 can be made of high permeability ferrite, for example. An interior region 57 between the sides 52 and rungs 54 can be filled with a ferromagnetic material (e.g. iron powder or ferrite powder) having a magnetic permeability lower than a permeability of the core 50. Powdered ferromagnetic materials can be bonded with a polymeric resin such as epoxy. Filling the region 57 with relatively low permeability material allows the leakage inductance to be tuned to an accurate value and allows the coupled inductor to be designed with a wide range of leakage inductance values.

The circuit of FIG. 7 is a two-phase device, with first and second coupled output inductors 32 34. First coupled inductor extends under the first side 52a, over the first rung 54a, and under the second side 52b. Similarly, the second coupled inductor 34 extends under the first side 52a, over the second rung 54b, and under the second side 52b. With this structure, the coupled inductors 32 34 will be inversely coupled, which is desired in the invention. Preferably, the inductors 32 34 are disposed between the sides 52a 52b and the circuit board 42 (i.e. as shown) in the regions where the inductors are "under" the sides 52a 52b.

In the present invention, the magnetic core 50 is preferably disposed "flat" on the circuit board 42, as shown in FIG. 7. In this context, "flat" means that the first side 52a, second side 52b, first rung 54a and second rung 54b define a plane that is parallel to the circuit board 42. Preferably, the magnetic core is disposed on or supported by the circuit board 42.

For clarity, FIG. 9 shows the coupled inductors 32 34 in isolation. Horizontal portions 44 can comprise patterned copper foil on the printed circuit board 42, as known in the art. Elevated portions 46 of the inductors 32 34 can comprise strips of copper foil or wire soldered to the horizontal portions 44.

Although the coupled inductors 32 34 are illustrated as having a single loop over the rungs 54a 54b, the present invention and appended claims include embodiments where the coupled inductors 32 34 have 2, 3, 4 or more loops around the rungs 54a 54b.

FIG. 10 shows a top view of a 4-phase coupled inductor. The 4-phase coupled inductor has a ladder structure magnetic core 50 with 4 rungs 54a 54b 54c 54d. Each rung has an associated coupled inductor 32 34 56 58. Every coupled inductor 32 34 56 58 extends under the first side 52a, under the second side 52b, and over its associated rung 54a 54b 54c 54d. The ladder structure magnetic core 50 can be extended to any number of phases by increasing a length of the first side 52a and second side 52b, and increasing the number of rungs 54. One rung should be provided for each phase.

The sides 52a 52b and rungs 54 are connected at an angle 60. In the device of FIG. 10, the angle 60 is not perpendicular. A nonperpendicular angle 60 can provide an advantage by allowing a length of the inductors 32 34 56 58 to be slightly shortened, thereby decreasing the ohmic resistance. This effect is provided when the inductors 32 34 56 58 extend under the sides 52a 52b where the angle between rungs 54 and sides 52 is less than 90 degrees (as illustrated in FIG. 10). Preferably, the angle 60 is in the range of 20 to 70 degrees, more preferably, in the range of 30-60 degrees.

Alternatively, the angle 60 can be perpendicular, which is the case in the embodiments of FIGS. 7 and 9.

In the device of FIG. 10, switches Q1 Q2 Q3 Q4 Q5 Q6 Q7 Q8 are connected to the coupled inductors 32 34 56 58 such that the circuit is a buck converter. However, the present coupled inductors with the ladder structure magnetic core 50 can be used with boost and buck-boost converters by rearranging the connections to the switches, Vin and Vout.

Figure 11:
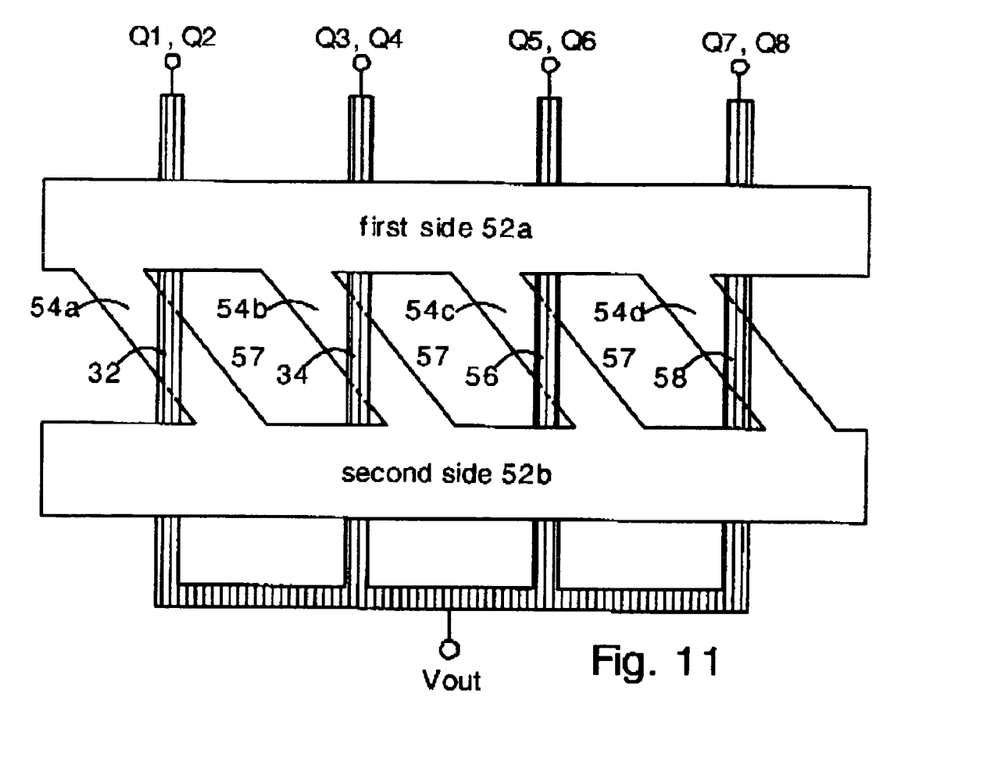
FIG. 11 shows a top view of an embodiment in which the inductors are straight as viewed from above. In this embodiment, the inductors have a minimal length.

FIG. 11 shows a top view of a 4-phase coupled inductor in which the inductors are straight as viewed from above. When designed to be straight as viewed from above, the inductors 32 34 56 58 will have a minimal length and therefore minimal ohmic resistance and high energy efficiency.

Figure 12:
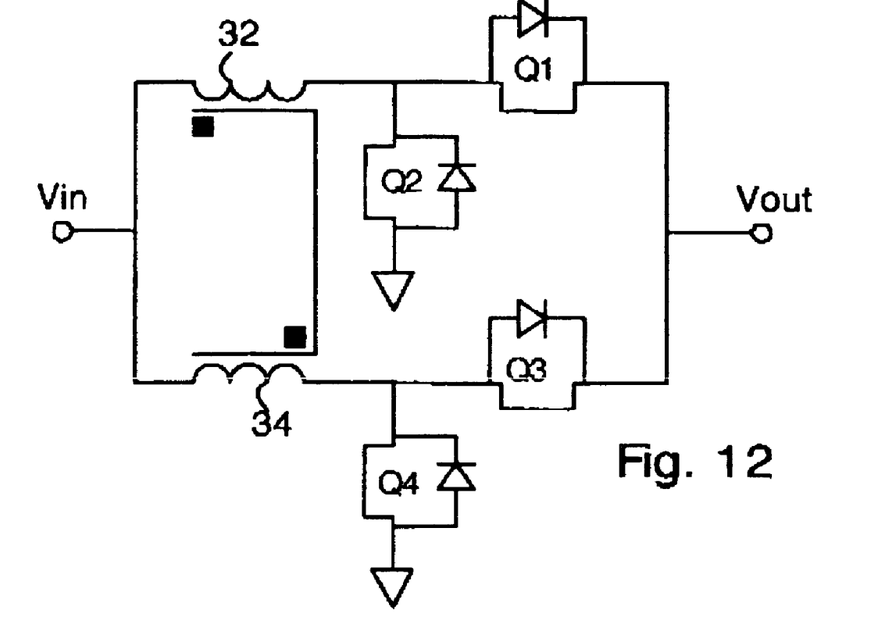
FIG. 12 shows a circuit diagram of a boost converter which can employ the coupled inductors of the present invention.

FIG. 12 shows a circuit diagram of a 2-phase boost converter. The circuit has top switches Q1 Q3 and bottom switches Q2 Q4. The switches alternately charge and discharge the coupled inductors 32 34. The coupled inductors 32 34 in the boost converter can have the structure according to the present invention and illustrated in FIG. 4, 5, 6, 7, 8, 9, or 10. However, the connections of switches Q1 Q2 Q3 Q4 and Vin and Vout must be rearranged according to FIG. 12, which is apparent from inspection.

Figure 13:
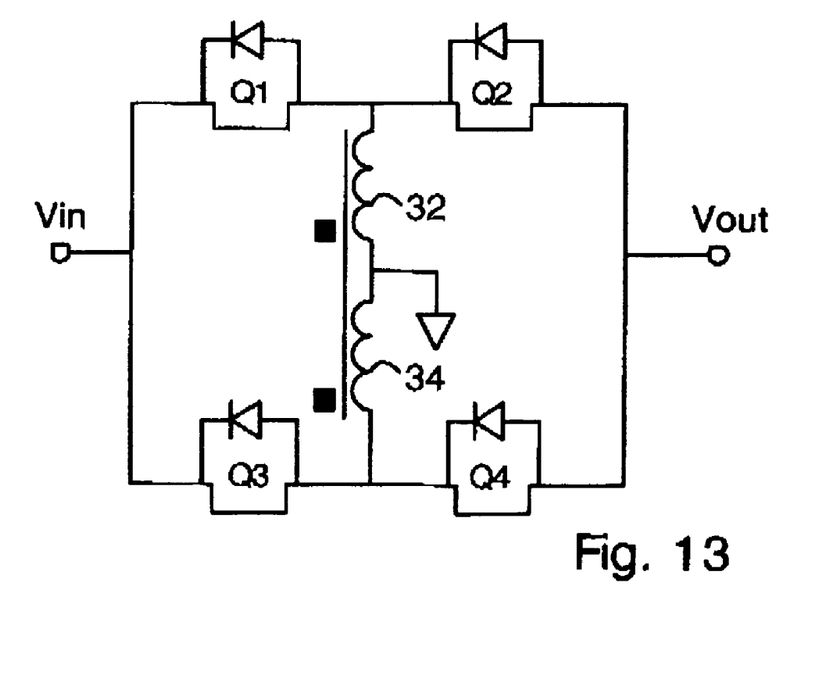
FIG. 13 shows a circuit diagram of a buck-boost converter which can employ the coupled inductors of the present invention.

FIG. 13 shows a circuit diagram of a 2-phase buck-boost converter. The circuit has top switches Q1 Q3 and bottom switches Q2 Q4. The switches alternately charge and discharge the inductors 32 34. The switches alternately charge and discharge the coupled inductors 32 34. The coupled inductors 32 34 in the buck-boost converter can have the structure according to the present invention and illustrated in FIG. 4, 5, 6, 7, 8, 9 or 10. In this case, the connections of switches Q1 Q2 Q3 Q4 and Vin and Vout must be rearranged according to FIG. 13, which is apparent from inspection.

The present invention provides multiphase buck, boost, and buck-boost voltage converters with exceptionally high energy efficiency and exceptionally fast transient response. The inductors have desired amounts of inductance, but very low electrical resistance values since they have relatively short lengths. The unique structure and shape of the coupled inductors allows the inductors to have a minimal ohmic resistance. The multiphase voltage converters of the present invention can operate at exceptionally high frequencies, for example 500 Khz or 1 Mhz or higher for example. The present multiphase converters can be used to increase or decrease or reverse the polarity of the voltage of a power supply. The present multiphase converters can be used in a wide range of applications such as for powering microprocessors and other computers, telecommunications equipment, and linear or analog signal electronics.

It is important to note that the terms "over" and "under" in the appended claims do not imply a specific orientation to the circuit board 42, which is optional in the invention. The terms "over" and "under" are relative terms. The magnetic cores 26 and 50 and inductors 32 34 can have any orientation with respect to the circuit board. For example, the magnetic cores 26 and 50 can be inverted from that shown in FIGS. 4, 6, and 7.

It will be clear to one skilled in the art that the above embodiment may be altered in many ways without departing from the scope of the invention. For example, the shapes of the magnetic cores can be changed in many ways without departing from the present invention and scope of the appended claims (provided that the woven topology remains unchanged). Accordingly, the scope of the invention should be determined by the following claims and their legal equivalents.

What is claimed is:

1. A multiphase buck or boost or buck-boost converter, comprising:
   a magnetic core having a ladder structure comprising first and second side rails which are approximately parallel and first and second connecting rungs wherein said side rails and rungs substantially define a plane, said magnetic core comprising not more than two pieces;
   a first inductor extending principally in a direction parallel to said plane and passing under the first side rail, only once over the first rung, and under the second side rail; and
   a second inductor extending principally in a direction parallel to said plane and passing under the first side rail, only once over the second rung, and under the second side rail.

2. The multiphase buck or boost or buck-boost converter of claim 1, further comprising a circuit board, wherein the magnetic core is disposed flat on the circuit board.

3. The multiphase buck or boost or buck-boost converter of claim 2, wherein:
   the first inductor extends between the first side rail and circuit board, and between the second side rail and circuit board, and
   the second inductor extends between the first side rail and circuit board, and between the second side rail and circuit board.

4. The multiphase buck or boost or buck-boost converter of claim 1, wherein the connecting rungs are perpendicular to the first and second side rails.

5. The multiphase buck or boost or buck-boost converter as recited in claim 1, wherein said magnetic core comprises two pieces which are identical in shape.

6. A multiphase voltage converter, comprising:
   a magnetic core having a ladder structure comprising a first side rail and a second side rail approximately parallel to the first side rail, a first rung and a second rung connecting said first and second side rails, said first and second side rails and said first and second rungs substantially defining a plane, said magnetic core comprising not more than two pieces;
   a first inductor extending under the first side rail, extending only once over the first rung, and extending under the second side rail, said first inductor extending principally in a direction parallel to said plane; and
   a second inductor extending under the first side rail, extending only once over the second rung, and extending under the second side rail, said second inductor extending principally in a direction parallel to said plane.

7. The multiphase voltage converter as recited in claim 6, wherein said magnetic core comprises two identical pieces.

8. A multiphase voltage converter, comprising:
   a magnetic core comprising not more than two pieces having a ladder structure comprising a first side rail and a second side rail approximately parallel to the first side rail, a first rung connecting said first and second side rails, and a second rung connecting said first and second side rails, said first and second side rails and said first and second rungs substantially defining a plane;
   a first inductor, said first inductor extending principally in a direction parallel to said plane, coupled to the first side rail by only an approximately straight conductor, to the first rung by only a winding section having less than one winding of a conductor, and to the second side rail only an approximately straight conductor; and
   a second inductor, said second inductor extending principally in a direction parallel to said plane, coupled to the first side rail by only an approximately straight conductor, to the second rung by only a winding section having less than one winding of a conductor, and to the second side rail by only an approximately straight conductor.

9. The multiphase voltage converter as recited in claim 8, wherein said magnetic core comprises two identical pieces.

\* \* \* \* \*